UNITED STATES PATENT OFFICE.

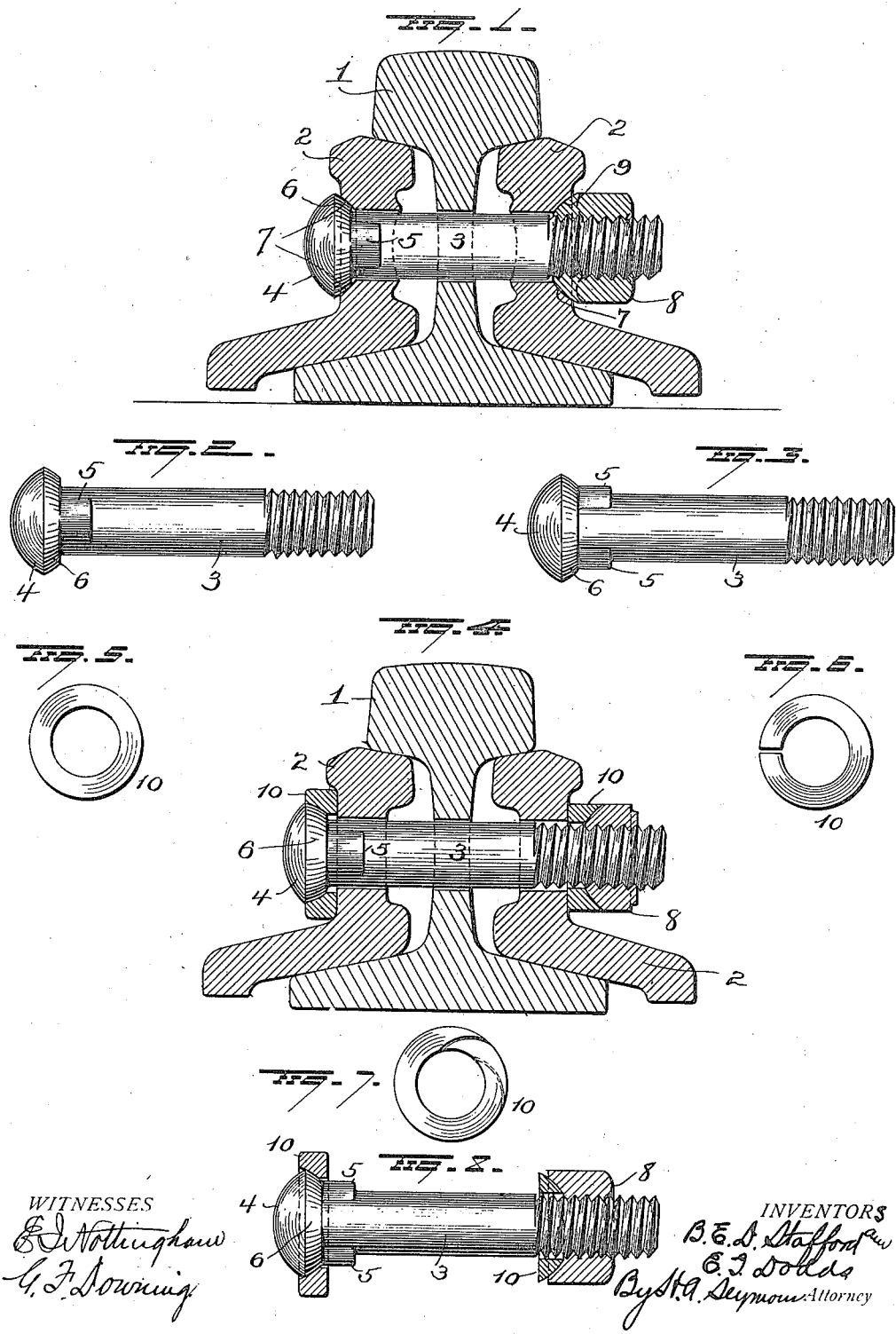

BENJAMIN E. D. STAFFORD AND ETHAN I. DODDS, OF PITTSBURGH, PENNSYLVANIA, ASSIGNORS TO FLANNERY BOLT COMPANY, OF PITTSBURGH, PENNSYLVANIA.

RAILROAD-TRACK CONSTRUCTION.

1,295,937. Specification of Letters Patent. Patented Mar. 4, 1919.

Application filed October 28, 1915. Serial No. 58,369.

*To all whom it may concern:*

Be it known that we, BENJAMIN E. D. STAFFORD and ETHAN I. DODDS, citizens of the United States, and residents of Pittsburgh, in the county of Allegheny and State of Pennsylvania, have invented certain new and useful Improvements in Railroad-Track Construction; and we do hereby declare the following to be a full, clear, and exact description of the invention, such as will enable others skilled in the art to which it appertains to make and use the same.

Our invention relates to an improvement in railroad track construction, the object being to provide a bolt mounted at its ends in curved seats and capable of universal movement so that the tensile strains will at all times be equally distributed throughout the bolt and its head, thus not only prolonging the life of the bolt, but also removing to a large extent the tendency of the nut to work loose.

With these ends in view our invention consists in a bolt the head of which is made convex and adapted to rest in a concave seat in or on the splice plate.

Our invention further consists in a bolt the head of which is convex on its inner face and a nut having a convex inner face, the said convex faces of the head and nut resting in similarly shaped recessed seats in or on the splice plates.

Our invention further consists in the details of construction as will be more fully explained and pointed out in the claims.

In the accompanying drawings, Figure 1 is a view in cross section of a rail and its splice plates showing our improvement applied thereto; Figs. 2 and 3 are views of the bolt; Fig. 4 is a view of a modified construction wherein the head of the bolt rests against a washer; Figs. 5, 6 and 7 are views of the washer, and Fig. 8 is a view of a modified form of nut and washer.

1 represents a railroad track rail, 2 the splice or fish plates connecting the rails at the joint, and 3 is our improved bolt, provided with a head 4 and side wings 5, the latter being of the usual construction and adapted to engage the splice plate and prevent the bolt from turning, the bolt hole in the splice plate being made oblong to receive the side wings.

The head 4 of the bolt is made convex or curved on its inner face as at 6, the curvature being preferably in the arc of a circle, and the splice plate 2, against which the head rest, is provided with a recessed seat 7 conforming to the curvature of the inner face of the head of the bolt, so that the latter will be free to have a limited universal movement on its seat, or the parts carrying the seat will be free to move on the curved face of the head of the bolt. The opposite end of the bolt 3 is threaded as usual and the nut 8 thereon is provided with a rounded or convex end 9 which rests in the recessed seat 7 in its splice or fish plate 2.

With this arrangement it will be seen that the bolt is free to move to accommodate itself to the movements of the parts to which it is applied.

There is always more or less sinking or sinuous movement of the rails when an engine or car is passing over the same and the movement is greater at the joint or meeting ends of the rails than at any other point. With the old style of bolt having a flat inner face, when this yield in the rails takes place, one side or point of the head, at the periphery of the latter, engages the splice plate and acts as a fulcrum and thus distributes the strains to a part only of the bolt. With this improvement the head and nut are free to move in their seats and rest solidly therein so that the whole area of the head and nut take the strains and distribute them to all parts of the bolt evenly, and it is this equalization of the strains that operates to prolong the life of the bolt, and at the same time prevents or lessens those movements of the bolt and nut which tend to loosen the nut.

In Fig. 4 we have shown as a modification, a washer 10 interposed between the head of the bolt and the splice bars, and between the nut and the splice bar, the said washers having curved seats conforming to the curvature of the inner faces of the head and nut. This construction is designed for repair work, and for use with the ordinary splice bars that are now in general use.

The washers, when used, may be in the form of endless rings, as in Fig. 5, or they may be split rings as in Figs. 6 and 7. When split rings are used they act as spring seats which give or yield under the pounding of the wheels on the rails and contract to normal position as soon as the strains are removed. This spring or elasticity of the washer holds the nut at all times under a pressure sufficient to prevent it from turning.

Again, instead of making the nut with a convex end to fit within a concave seat in the washer as shown in Fig. 4, the nut may have the concavity to receive a convex washer as shown in Fig. 8.

A bolt supported at its ends as shown and above described, is capable of limited universal movement so as to accommodate itself to the movements of the rails and splice plates, and maintain an even bearing at its head and nut so that the pull on the bolt will be uniform and the strains evenly distributed throughout the entire area of the bolt.

It is evident that many slight changes might be resorted to in the relative arrangement of parts shown and described without departing from the spirit and scope of our invention. Hence we would have it understood that we do not wish to confine ourselves to the exact construction and arrangement of parts shown and described except as defined by the scope of the appended claims.

Having fully described our invention what we claim as new and desire to secure by Letters Patent, is:—

1. A track bolt having a head at one end, the entire inner or bearing face of the head being curved and adapted for use with a curved seat, so as to provide for rocking movement of the bolt head in its seat, and wings on the shank adjacent the curved bearing face, but not on the latter.

2. The combination of a bolt headed at one end and threaded at the other end, the rear face of the head of the bolt being curved and the shank of the bolt provided with side wings adjacent the curved bearing face, but not on the latter, a nut for the threaded end of the bolt, the inner face of the nut being curved, and splice plates through which the bolt passes the splice plates being provided with curved seats to receive the curved bearing faces of the head and nut so as to provide for rocking movement of the bolt and nut and one of said splice plates having slots for the reception of the side wings on the bolt shank.

In testimony whereof we have signed this specification in the presence of two subscribing witnesses.

BENJAMIN E. D. STAFFORD.
ETHAN I. DODDS.

Witnesses:
EDWIN S. RYCE,
F. H. ALLISON.